United States Patent [19]
San Miguel Bento

[11] Patent Number: 5,932,106
[45] Date of Patent: Aug. 3, 1999

[54] PROCESS FOR REGENERATION OF ION-EXCHANGE RESINS USED FOR SUGAR DECOLORIZATION, USING CHLORIDE SALTS IN A SUCROSE SOLUTION ALKALINIZED WITH CALCIUM HYDROXIDE

[75] Inventor: Louis Rocha San Miguel Bento, Senhora da Hora, Portugal

[73] Assignee: RAR—Refinarias de Açúcar Reunidas, S.A., Portugal

[21] Appl. No.: 08/710,495

[22] Filed: Sep. 18, 1996

Related U.S. Application Data

[63] Continuation-in-part of application No. 08/656,210, filed as application No. PCT/PT95/00006, Dec. 19, 1995.

Foreign Application Priority Data

Jul. 21, 1995 [PT] Portugal ..................................... 101740

[51] Int. Cl.$^6$ .................................................. B01D 15/04
[52] U.S. Cl. .......................... 210/674; 127/46.2; 210/917; 521/26
[58] Field of Search .................................. 127/46.2, 46.3, 127/48; 210/674, 663, 665, 692, 702, 788, 805, 917; 521/26

[56] References Cited

U.S. PATENT DOCUMENTS

| | | | |
|---|---|---|---|
| 2,507,992 | 5/1950 | Payne et al. | 127/46.2 |
| 4,353,992 | 10/1982 | Pannekeet | 521/26 |

FOREIGN PATENT DOCUMENTS

| | | |
|---|---|---|
| 0 016 992 | 10/1980 | European Pat. Off. . |
| 0 032 263 | 7/1981 | European Pat. Off. . |
| 0 369 831 | 5/1990 | European Pat. Off. . |
| 1 404 591 | 11/1965 | France . |

OTHER PUBLICATIONS

Derwent Abstract, WPI Database, of SU,A,1723,135 published Mar. 30, 1992.

Chemical Abstract, vol. 104, No. 104: 35880e, 1986.

*Primary Examiner*—Ivars Cintins
*Attorney, Agent, or Firm*—Wenderoth, Lind & Ponack, L.L.P.

[57] ABSTRACT

Process for regeneration of ion-exchange resins, used in sugar decolorization, using a sucrose solution with sodium or calcium chloride, or another chloride, namely potassium or a mixture of those chlorides, alkalinised with calcium hydroxide. The regeneration of the resin is made with a flow between 1 to 3 cubic meters of a regenerating solution by a cubic meter of resin/hour and a temperature between 40° to 70° centigrade. The sucrose solution used in this resin regeneration process contains between 30 to 600 g of sucrose per liter of solution; calcium hydroxide between 1 to 40 g of CaO per liter of solution; and calcium or sodium chloride, or another chloride, namely the one of potassium, or a mixture of these compounds, in such a quantity that chloride ion concentration is between 3 to 30 g per liter of solution. This regenerating solution is passed through the resin in a quantity between 2 to 4 cubic meters per cubic meter of resin. The effluent from this resin regeneration process, containing sucrose and a low content of chloride ions, can be used, directly or after a chemical or physical treatment, in sugar production or sugar refining processes.

6 Claims, No Drawings

PROCESS FOR REGENERATION OF ION-EXCHANGE RESINS USED FOR SUGAR DECOLORIZATION, USING CHLORIDE SALTS IN A SUCROSE SOLUTION ALKALINIZED WITH CALCIUM HYDROXIDE

This application is a continuation-in-part of now abandoned application, Ser. No. 08/656,210 filed Jun. 18, 1996, which is a 371of PCT/PT95/00006, filed Dec. 19, 1995.

TECHNICAL FIELD

The present invention refers to a regeneration process for ion-exchange resins used in the decolorization of sugar solutions in cane or beet sugar factories, sugar refineries, or in industries using sugar.

BACKGROUND ART

In the classic process for regeneration sugar decolorization resins, a solution of 10% of sodium chloride alkalinized with sodium hydroxide is used. However, this process of regeneration is not efficient in colorants removal from resin and produces polluted effluents. In fact, salt effluents resulting from resins regeneration by alkalinized solutions of sodium chloride cause a big problem because they have a high content of organic compounds with a high content of sodium chloride.

DISCLOSURE OF THE INVENTION

In the innovative process that is presented here, the resin regeneration is done with a sucrose solution alkalinized with calcium hydroxide, containing a small quantity of calcium chloride or sodium chloride, or another chloride, for example, potassium chloride or a mixture of those chlorides.

The advantage of this process is that the solution resulting from the regeneration, containing sucrose, can be used in sugar production or sugar refining, without causing pollution problems, as happens in the classic process of resin regeneration.

This new process takes advantage of the following points:

solubility of calcium hydroxide increases with sucrose concentration in solution;

concentration of regenerating agents in this new process is much lower as compared with the classic sodium chloride regeneration;

at this low salts concentration resin do not shrink as much as in the classic sodium chloride regeneration;

calcium ions can be removed from effluent solutions by reaction with carbon dioxide, sodium carbonate, phosphoric acid, or sodium phosphate;

sucrose solutions with calcium hydroxide resulting from this new regeneration process can be used as a neutralizing agent for low purity products of sugar production or sugar refining.

In view of these facts, and in base of the present process we verify that we can regenerate resins, that is, remove the majority of the colorants fixed to the resin after the decolorization stepby using a sucrose solution with calcium hydroxide and a small quantity of chloride ions.

In this new process, we use a sucrose solution containing 30 to 600 g, more particularly 100 to 600 g, of sucrose per liter of solution, alkalinized with calcium hydroxide, containing 1 to 40 g, more particularly 5 to 40 g of CaO per liter of solution, and having calcium chloride or sodium chloride, or another chloride, as for example, potassium chloride or a mixture of those chlorides, in such a quantity that chloride ion concentration is between 3 to 30 g per liter of solution.

The sucrose solution, resulting from this new regeneration process, containing calcium hydroxide, chloride salts and colorants removed from the resin, can be returned to the sugar production or sugar refining processes, directly, or after treatment with chemicals or through tangential filtration.

In fact, this solution can be treated with carbon dioxide, sodium carbonate, phosphoric acid or sodium phosphate, to remove calcium before being used in sugar production or sugar refining.

Also tangential filtration processes can be used to separate the salts of this solution before it is re-used in sugar production or sugar refining processes.

Ion-exchange resin to be regenerated using the regeneration process described in this patent must be contained in an appropriate column or columns for a sugar decolorization process.

During the decolorization step, sugar solutions are fed to the resin column in an up-flow or down-flow way depending on the equipment used.

After the decolorization step, sugar solution inside the column is dislocated with water. During this procedure sucrose concentration in the column effluent decreases. When sucrose concentration reaches a value identical to sucrose in the regenerating solution, resin regeneration starts. For resin regeneration, a sucrose solution containing calcium hydroxide and sodium or calcium chloride or other chlorides, is fed to the resin column in a flow between 1 to 3 cubic meters per cubic meter of resin per hour and at a temperature between 40° to 70° C. The quantity of regenerating solution used in this regeneration is between 2 to 4 cubic meters per cubic meter of resin inside the column.

After the passage through the resin of this regenerating solution, the resin is washed with water, decompressed with air and washed again as usual in the resin regeneration processes.

From time to time and as is usual in decolorization resins, an acid regeneration (NaCl+HCl) and alkaline regeneration (NaCl+NaOH) can be performed.

PREFERRED EMBODIMENT OF THE INVENTION

This new resin regeneration process was experimentally used to regenerate a styrenic divinyl-benzenic resin with quaternay ammoniom groups, initially in the chloride form. The resin, placed in a one liter column was used to decolorize carbonated liquor from a sugar refinery. After 40 BV (bed volumes) of liquor, the resin was washed and regenerated with this new resin regeneration process. In ten successive liquor cycles and regenerations, resin efficiency was maintained at a high level with decolorization of liquor higher than 90%.

In this experiment, the solution effluent from the resin regeneration, with this new process, was treated by nanofiltration. It was observed that more than 90% of colour, measured at 420 nm at pH 7.0, was separated to the retentate. The permeate was used to prepare the regenerating solution, after adding the appropriate quantities of sucrose, calcium hydroxide and calcium chloride. Resin regenerated with this permeate maintained the efficiency above 90% of decolorization.

I claim:

1. In a process comprising decolorizing a sugar solution by contacting said solution with an ion-exchange resin, and recovering a decolorized sugar solution, wherein the resin is regenerated, the improvement which comprises regenerating said resin by contacting it with a regenerating solution containing 30 to 600 grams of sucrose per liter of solution, calcium hydroxide in a quantity, calculated on the basis of CaO, of between 1 to 40 grams of CaO per liter, and calcium chloride, in a quantity such that the chloride ion concentration is between 3 to 30 grams of chloride per liter solution.

2. The process according to claim 1 wherein the resin regeneration is accomplished by flowing the regenerating solution through a body of the resin at a flow rate of between 1 to 3 cubic meters of said regenerating solution per cubic meter of resin, per hour, at a temperature of between 40 and 70° C.

3. The process according to claim 2 wherein the amount of regenerating solution employed is between 2 to 4 cubic meters per cubic meter of resin.

4. The process according to claim 1 the amount of regenerating solution employed is between 2 to 4 cubic meters per cubic meter of resin.

5. The process according to claim 1 wherein the regenerating solution, after contacting said resin, is subjected to calcium precipitation with carbon dioxide, sodium carbonate, phosphoric acid or sodium phosphate.

6. The process according to claim 1 wherein the regenerating solution, after contacting said resin, is subjected to tangential filtration through a filtration medium, resulting in a portion retained in the filtration medium containing the majority of colorants and a portion which permeates the filter medium which is recycled to said process, where it is employed in the production of said regenerating solution.

* * * * *